United States Patent
Chen et al.

(10) Patent No.: US 11,380,274 B2
(45) Date of Patent: Jul. 5, 2022

(54) ELECTRO-OPTIC DISPLAYS AND DRIVING METHODS

(71) Applicant: E Ink California, LLC, Fremont, CA (US)

(72) Inventors: Shang-Chia Chen, Fremont, CA (US); Yajuan Chen, Fremont, CA (US); Craig Lin, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 17/243,989

(22) Filed: Apr. 29, 2021

(65) Prior Publication Data

US 2021/0248967 A1 Aug. 12, 2021

Related U.S. Application Data

(63) Continuation of application No. 16/693,709, filed on Nov. 25, 2019, now Pat. No. 11,062,663.

(60) Provisional application No. 62/773,609, filed on Nov. 30, 2018.

(51) Int. Cl.
*G09G 3/34* (2006.01)
*G02F 1/167* (2019.01)

(52) U.S. Cl.
CPC ........... *G09G 3/344* (2013.01); *G02F 1/167* (2013.01); *G09G 2230/00* (2013.01)

(58) Field of Classification Search
None
See application file for complete search history.

(56) References Cited

U.S. PATENT DOCUMENTS

| | | |
|---|---|---|
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |

(Continued)

FOREIGN PATENT DOCUMENTS

KR 20110124107 A 11/2011

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

(Continued)

*Primary Examiner* — Matthew Yeung
(74) *Attorney, Agent, or Firm* — Ioannis Constantinides

(57) ABSTRACT

A driving method for driving an electrophoretic display comprising four types of particles, the first type of particles and the third type of particles are positively charged, and the second type of particles and the fourth type of particles are negatively charged, the method comprises the steps of: (i). applying a first driving voltage to the pixel of the electrophoretic display for a first period of time at a first amplitude to drive the pixel to a color state of the fourth type of particle at the viewing side; and (ii). applying a second driving voltage to the pixel of the electrophoretic display for a second period of time, opposite to that of the first driving voltage and a second amplitude smaller than that of the first amplitude, to drive the second type particle towards the non-viewing side.

19 Claims, 11 Drawing Sheets

(56) References Cited

U.S. PATENT DOCUMENTS

| | | |
|---|---|---|
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,046,228 B2 | 5/2006 | Liang et al. |
| 7,061,166 B2 | 6/2006 | Kuniyasu |
| 7,061,662 B2 | 6/2006 | Chung et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,688,297 B2 | 3/2010 | Zehner et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,232,961 B2 | 7/2012 | Fan et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,319,759 B2 | 11/2012 | Jacobson et al. |
| 8,373,649 B2 | 2/2013 | Low et al. |
| 8,384,658 B2 | 2/2013 | Albert et al. |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,593,396 B2 | 11/2013 | Amundson et al. |
| 8,605,032 B2 | 12/2013 | Liu et al. |
| 8,643,595 B2 | 2/2014 | Chung et al. |
| 8,665,206 B2 | 3/2014 | Lin et al. |
| 8,681,191 B2 | 3/2014 | Yang et al. |
| 8,704,754 B2 | 4/2014 | Machida et al. |
| 8,730,153 B2 | 5/2014 | Sprague et al. |
| 8,810,525 B2 | 8/2014 | Sprague |
| 8,928,562 B2 | 1/2015 | Gates et al. |
| 8,928,641 B2 | 1/2015 | Chiu et al. |
| 8,963,903 B2 | 2/2015 | Sakamoto et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,171,508 B2 | 10/2015 | Sprague et al. |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,269,311 B2 | 2/2016 | Amundson |
| 9,299,294 B2 | 3/2016 | Lin et al. |
| 9,373,289 B2 | 6/2016 | Sprague et al. |
| 9,383,623 B2 | 7/2016 | Lin et al. |
| 9,390,066 B2 | 7/2016 | Smith et al. |
| 9,390,661 B2 | 7/2016 | Chiu et al. |
| 9,412,314 B2 | 8/2016 | Amundson et al. |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,743 B2 | 12/2016 | Sjodin et al. |
| 9,514,667 B2 | 12/2016 | Lin |
| 9,542,895 B2 | 1/2017 | Gates et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,792,861 B2 | 10/2017 | Chang et al. |
| 9,792,862 B2 | 10/2017 | Hung et al. |
| 9,966,018 B2 | 5/2018 | Gates et al. |
| 10,147,366 B2 | 12/2018 | Lin et al. |
| 10,229,641 B2 | 3/2019 | Yang et al. |

(56) References Cited

U.S. PATENT DOCUMENTS

| | | |
|---|---|---|
| 10,319,313 B2 | 6/2019 | Harris et al. |
| 10,339,876 B2 | 7/2019 | Lin et al. |
| 10,672,350 B2 | 6/2020 | Amundson et al. |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2007/0091418 A1 | 4/2007 | Danner et al. |
| 2007/0103427 A1 | 5/2007 | Zhou et al. |
| 2007/0176912 A1 | 8/2007 | Beames et al. |
| 2007/0297038 A1* | 12/2007 | Chopra ............... G02B 26/026 359/296 |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0303780 A1 | 12/2008 | Sprague et al. |
| 2009/0174651 A1 | 7/2009 | Jacobson et al. |
| 2009/0322721 A1 | 12/2009 | Zehner et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0063314 A1 | 3/2011 | Chiu et al. |
| 2011/0175875 A1 | 7/2011 | Lin et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2013/0063333 A1 | 3/2013 | Arango et al. |
| 2013/0249782 A1 | 9/2013 | Wu et al. |
| 2014/0009817 A1 | 1/2014 | Wilcox et al. |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2015/0097877 A1* | 4/2015 | Lin ...................... G09G 3/344 345/691 |
| 2015/0262255 A1 | 9/2015 | Khajehnouri et al. |
| 2015/0262551 A1 | 9/2015 | Zehner et al. |
| 2016/0041448 A1* | 2/2016 | Lin ........................ G02F 1/167 359/296 |
| 2016/0140910 A1 | 5/2016 | Amundson |
| 2016/0180777 A1 | 6/2016 | Lin et al. |

OTHER PUBLICATIONS

Wood, D., "An Electrochromic Renaissance?" Information Display, 18(3), 24 (Mar. 2002) Mar. 1, 2002.

Bach, Udo. et al., "Nanomaterials-Based Electrochromics for Paper-Quality Displays", Adv. Mater, vol. 14, No. 11, pp. 845-8, (Jun. 5, 2002) Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). 2001.

Yamaguchi, Y. et al., "Toner display using insulative particles charged triboelectrically", Asia Display/IDW '01, pp. 1729-1730, Paper AMD4-4 (2001). 2001.

Korean Intellectual Property Office, PCT/US2019/062904, International Search Report and Written Opinion, dated Mar. 10, 2020. Mar. 10, 2020.

\* cited by examiner

ELECTRO-OPTIC DISPLAYS AND DRIVING METHODS

REFERENCE TO RELATED APPLICATIONS

This application claims priority to U.S. patent application Ser. No. 16/693,709, filed on Nov. 25, 2019, published on Jun. 4, 2020 as US 20200175929, which claims the benefit of U.S. Provisional Application Ser. No. 62/773,609 filed on Nov. 30, 2018.

The entire disclosures of the aforementioned application is herein incorporated by reference.

FIELD OF THE INVENTION

The subject matter presented herein is directed to driving methods for electro-optic display devices.

BACKGROUND

In order to achieve a color display, color filters are often used. The most common approach is to add color filters on top of black/white sub-pixels of a pixelated display to display the red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When a black state is desired, all three-sub-pixels are turned to the black state. When a white state is desired, the three sub-pixels are turned to red, green and blue, respectively, and as a result, a white state is seen by the viewer.

The biggest disadvantage of such a technique is that since each of the sub-pixels has a reflectance of about one third ($\frac{1}{3}$) of the desired white state, the white state is fairly dim. To compensate this, a fourth sub-pixel may be added which can display only the black and white states, so that the white level is doubled at the expense of the red, green or blue color level (where each sub-pixel is now only one fourth of the area of a pixel). Brighter colors can be achieved by adding light from the white pixel, but this is achieved at the expense of color gamut to cause the colors to be very light and unsaturated. A similar result can be achieved by reducing the color saturation of the three sub-pixels. Even with these approaches, the white level is normally substantially less than half of that of a black and white display, rendering it an unacceptable choice for display devices, such as e-readers or displays that need well readable black-white brightness and contrast.

SUMMARY OF INVENTION

This invention provides a driving method for driving a pixel of an electrophoretic display comprising a first surface on a viewing side, a second surface on a non-viewing side, and an electrophoretic fluid disposed between a first light-transmissive electrode a second electrode, the electrophoretic fluid comprising a first type of particles, a second type of particles, a third type of particles, and a fourth type of particles, all of which are dispersed in a solvent, wherein the four types of pigment particles have different optical characteristics, the first type of particles and the third type of particles are positively charged, wherein the first type of particles have a greater magnitude of positive charge than the third particles, and the second type of particles and the fourth type of particles are negatively charged, wherein the second type of particles have a greater magnitude of negative charge than the fourth particles, the method comprises the steps of: (i). applying a first driving voltage to the pixel of the electrophoretic display for a first period of time at a first amplitude to drive the pixel to a color state of the fourth type of particle at the viewing side; and (ii) applying a second driving voltage to the pixel of the electrophoretic display for a second period of time, opposite to that of the first driving voltage and a second amplitude smaller than that of the first amplitude, to drive the second type particle towards the non-viewing side.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
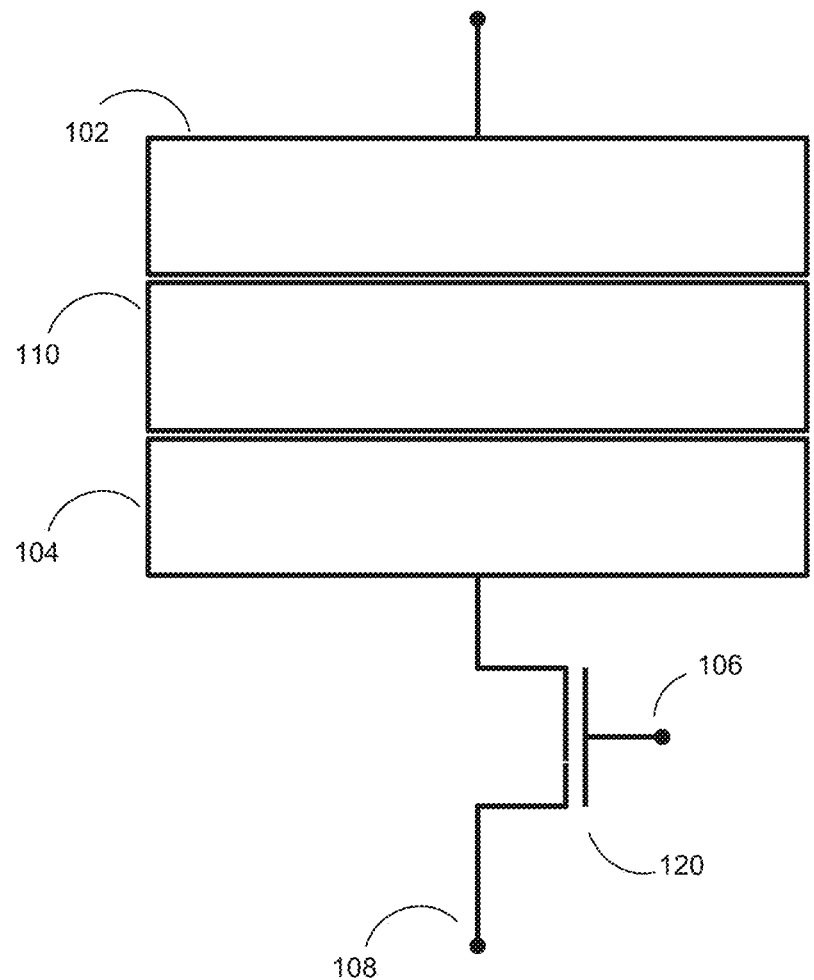
FIG. 1 illustrates a schematic representation of an electro-optic display in accordance with the subject matter presented herein.

The present invention relates to methods for driving electro-optic displays in dark mode, especially bistable electro-optic displays, and to apparatus for use in such methods. More specifically, this invention relates to driving methods which may allow for reduced "ghosting" and edge artifacts, and reduced flashing in such displays when displaying white text on a black background. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to above describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Much of the discussion below will focus on methods for driving one or more pixels of an electro-optic display through a transition from an initial gray level (or "graytone") to a final gray level (which may or may not be different from the initial gray level). The terms "gray state," "gray level" and "graytone" are used interchangeably herein and include the extreme optical states as well as the intermediate gray states. The number of possible gray levels in current systems is typically 2-16 due to limitations such as discreteness of driving pulses imposed by the frame rate of the display drivers and temperature sensitivity. For example, in a black and white display having 16 gray levels, usually, gray level 1 is black and gray level 16 is white; however, the black and white gray level designations may be reversed. Herein, graytone 1 will be used to designate black. Graytone 2 will be a lighter shade of black as the graytones progress towards graytone 16 (i.e., white).

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U. S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It should be appreciated that even though the various embodiments presented below use electrophoretic materials with micro-cells to illustrate the working principles in accordance with the subject matter presented herein, the same principles may be easily adopted for electrophoretic materials with micro-capsulized particles (e.g., pigment particles). Electrophoretic material with micro-cells are used herein for illustration and not to serve as a limitation.

FIG. 1 illustrates a schematic model of a display pixel 100 of an electro-optic display in accordance with the subject matter presented herein. Pixel 100 may include an imaging film 110. In some embodiments, imaging film 110 may be a layer of electrophoretic material and bistable in nature. This electrophoretic material may include a plurality of electrically charged color pigment particles (e.g., black, white, yellow or red) disposed in a fluid and capable of moving through the fluid under the influence of an electric field. In some embodiments, imaging film 110 may be an electrophoretic film having micro-cells with charged pigment particles. In some other embodiments, imaging film 110 may include, without limitation, an encapsulated electrophoretic imaging film, which may include, for example, charged pigment particles. It should be appreciated that the driving method presented below may be easily adopted for either types of electrophoretic material (e.g., encapsulated or film with micro-cells).

In some embodiments, imaging film 110 may be disposed between a front electrode 102 and a rear or pixel electrode 104. Front electrode 102 may be formed between the imaging film and the front of the display. In some embodiments, front electrode 102 may be transparent and light-transmissive. In some embodiments, front electrode 102 may be formed of any suitable transparent material, including, without limitation, indium tin oxide (ITO). Rear electrode 104 may be formed on an opposed side of the imaging film 110 to the front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may be a diode and/or a transistor, including, without limitation, a MOSFET or a Thin-Film Transistor (TFT). The drain (or source) of the MOSFET or TFT may be coupled to back-plate or pixel electrode 104, the source (or drain) of the MOSFET or TFT may be coupled to the addressing electrode 108, and the gate of the MOSFET or TFT may be coupled to a driver electrode 106 configured to control the activation and deactivation of the MOSFET or TFT. (For simplicity, the terminal of the MOSFET or TFT coupled to back-plate electrode 104 will be referred to as the MOSFET or TFT's drain, and the terminal of the MOSFET or TFT coupled to addressing electrode 108 will be referred to as the MOSFET or TFT's source. However, one of ordinary skill in the art will recognize that, in some embodiments, the source and drain of the MOSFET or TFT may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In use, the pixels 100 of the active matrix may be written in a row-by-row manner. For example, a row of pixels may be selected by the row driver, and the voltages corresponding to the desired optical states for the row of pixels may be applied to the pixels by the column drivers. After a preselected interval known as the "line address time," the selected row may be deselected, another row may be selected, and the voltages on the column drivers may be changed so that another line of the display is written.

Figure 2:
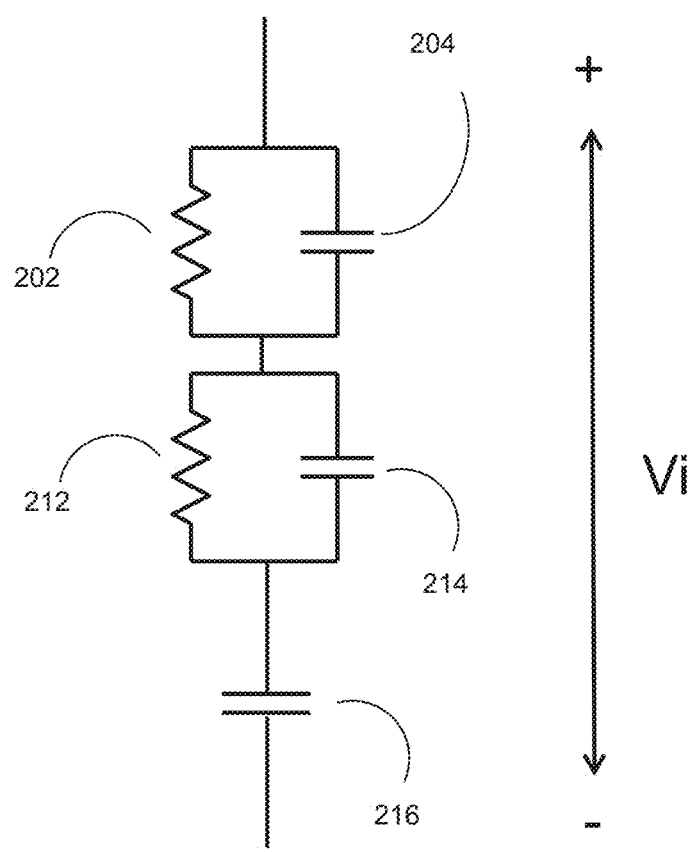
FIG. 2 illustrates an equivalent circuit representing the electro-optic display illustrated in FIG. 1.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the back-plane electrode. A voltage Vi across a pixel's imaging film 110 may include the pixel's remnant voltage.

Figure 3:
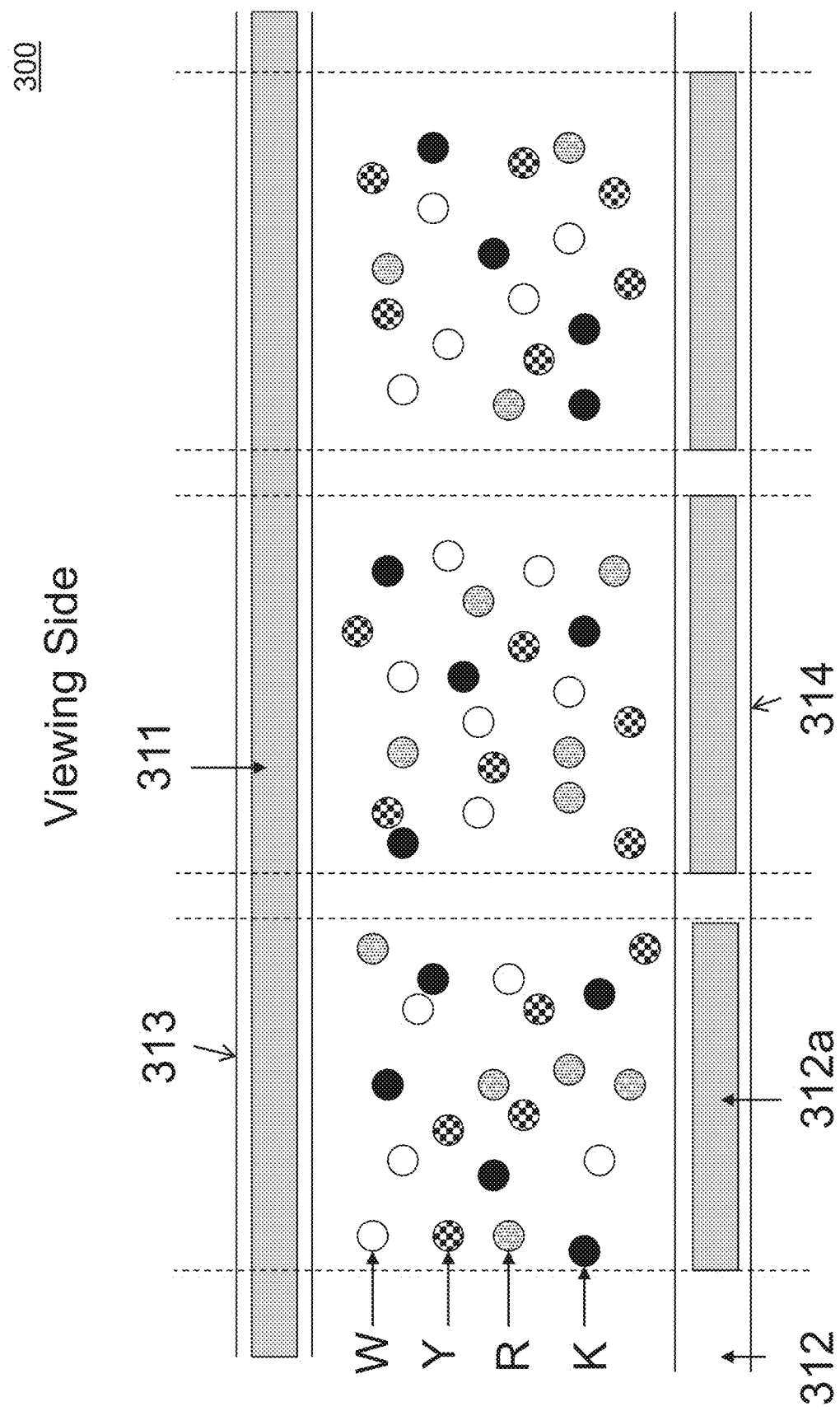
FIG. 3 illustrates cross sectional view of an electro-optic display in accordance with the subject matter presented herein.

A cross sectional view of an exemplary imaging film 300 (e.g., an electrophoretic film) similar to the image layer 110 shown in FIG. 1 is presented in FIG. 3. As illustrated in FIG. 3, the black particles (K) and yellow particles (Y) are the first pair of oppositely charged particles, and in this pair, the black particles are the high positive particles and the yellow particles are the high negative particles. The red particles (R) and the white particles (W) are the second pair of oppositely charged particles, and in this pair, the red particles are the low positive particles and the white particles are the low negative particles.

In another example not shown, the black particles may be the high positive particles; the yellow particles may be the low positive particles; the white particles may be the low negative particles and the red particles may be the high negative particles.

In addition, the color states of the four types of particles may be intentionally mixed. For example, because yellow pigment by nature often has a greenish tint and if a better yellow color state is desired, yellow particles and red particles may be used where both types of particles carry the same charge polarity and the yellow particles are higher charged than the red particles. As a result, at the yellow state, there will be a small amount of the red particles mixed with the greenish yellow particles to cause the yellow state to have better color purity.

It is understood that the scope of the invention broadly encompasses particles of any colors as long as the four types of particles have visually distinguishable colors.

For the white particles, they may be formed from an inorganic pigment, such as $TiO_2$, $ZrO_2$, $ZnO$, $Al_2O_3$, $Sb_2O_3$, $BaSO_4$, $PbSO_4$ or the like.

For the black particles, they may be formed from CI pigment black 26 or 28 or the like (e.g., manganese ferrite black spinel or copper chromite black spinel) or carbon black.

Particles of non-white and non-black colors are independently of a color, such as, red, green, blue, magenta, cyan or yellow. The pigments for color particles may include, but are not limited to, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

The color particles may also be inorganic pigments, such as red, green, blue and yellow. Examples may include, but are not limited to, CI pigment blue 28, CI pigment green 50 and CI pigment yellow 227.

In addition to the colors, the four types of particles may have other distinct optical characteristics, such as optical transmission, reflectance, luminescence or, in the case of displays intended for machine reading, pseudo-color in the sense of a change in reflectance of electromagnetic wavelengths outside the visible range.

A display layer utilizing the display fluid of the present invention has two surfaces, a first surface (313) on the viewing side and a second surface (314) on the opposite side of the first surface (313). The display fluid is sandwiched between the two surfaces. On the side of the first surface (313), there is a common electrode (311) which is a transparent electrode layer (e.g., ITO), spreading over the entire top of the display layer. On the side of the second surface (314), there is an electrode layer (312) which comprises a plurality of pixel electrodes (312a). It should be noted that the display layer presented in FIG. 3 and discussed herein can be of either a capsule based or cup based electrophoretic material, and the working principles presented herein can be applied to either material.

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel. As shown, each pixel has a corresponding pixel electrode. An electric field is created for a pixel by the potential difference between a voltage applied to the common electrode and a voltage applied to the corresponding pixel electrode.

The solvent in which the four types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as Isopar®, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

In one embodiment, the charge carried by the "low charge" particles may be less than about 50%, preferably about 5% to about 30%, of the charge carried by the "high charge" particles. In another embodiment, the "low charge" particles may be less than about 75%, or about 15% to about 55%, of the charge carried by the "high charge" particles. In a further embodiment, the comparison of the charge levels as indicated applies to two types of particles having the same charge polarity.

The charge intensity may be measured in terms of zeta potential. In one embodiment, the zeta potential is determined by Colloidal Dynamics AcoustoSizer IIM with a CSPU-100 signal processing unit, ESA EN # Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow-through cell for determination of the zeta potential.

The amplitudes of the "high positive" particles and the "high negative" particles may be the same or different. Likewise, the amplitudes of the "low positive" particles and the "low negative" particles may be the same or different.

It is also noted that in the same fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

Figure 4:
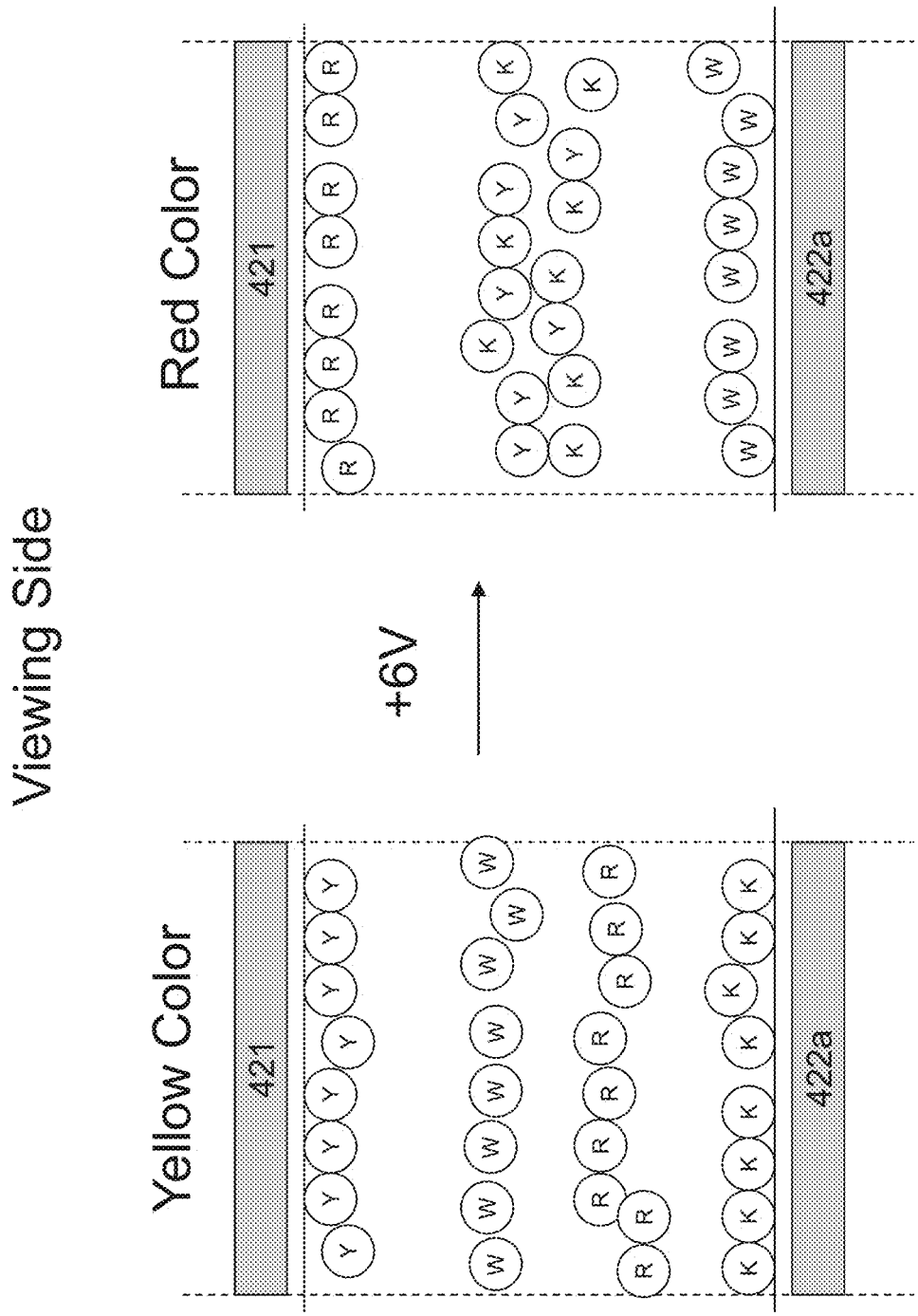
FIGS. 4a and 4b illustrate a display going from yellow to red in accordance with the subject matter presented herein.

FIGS. 4a and 4b illustrates an example of a display device utilizing such a display fluid. As shown in FIGS. 4a and 4b, the high positive particles are of a black color (K); the high negative particles are of a yellow color (Y); the low positive particles are of a red color (R); and the low negative particles are of a white color (W).

In operation, as shown in FIG. 4a, when a high negative voltage potential difference (e.g., −15V) is applied to a pixel for a time period of sufficient length, an electric field is generated to cause the yellow particles (Y) to be pushed to the common electrode (421) side and the black particles (K) pulled to the pixel electrode (422a) side. The red (R) and white (W) particles, because they carry weaker charges, move slower than the higher charged black and yellow particles and as a result, they stay in the middle of the pixel, with white particles above the red particles. In this case, a yellow color is seen at the viewing side.

Furthermore, as shown in FIG. 4b, when a lower positive voltage potential difference (e.g., +6V or +3V) is applied to the pixel of FIG. 4a (that is, driven from the yellow state) for a time period of sufficient length, an electric field is generated to cause the yellow particles (Y) to move towards the pixel electrode (422a) while the black particles (K) move towards the common electrode (421). However, when they meet in the middle of the pixel, they slow down significantly and remain there because the electric field generated by the low driving voltage is not strong enough to overcome the strong attraction between them. On the other hand, the electric field generated by the low driving voltage is sufficient to separate the weaker charged white and red particles to cause the low positive red particles (R) to move all the way to the common electrode (421) side (i.e., the viewing side) and the low negative white particles (W) to move to the pixel electrode (422a) side. As a result, a red color is seen. It is also noted that in this figure, there are also attraction forces between weaker charged particles (e.g., R) with stronger charged particles of opposite polarity (e.g., Y). However, these attraction forces are not as strong as the attraction force between two types of stronger charged particles (K and Y) and therefore they can be overcome by the electric field generated by the low driving voltage. In other words, weaker charged particles and the stronger charged particles of opposite polarity can be separated.

Figure 5:
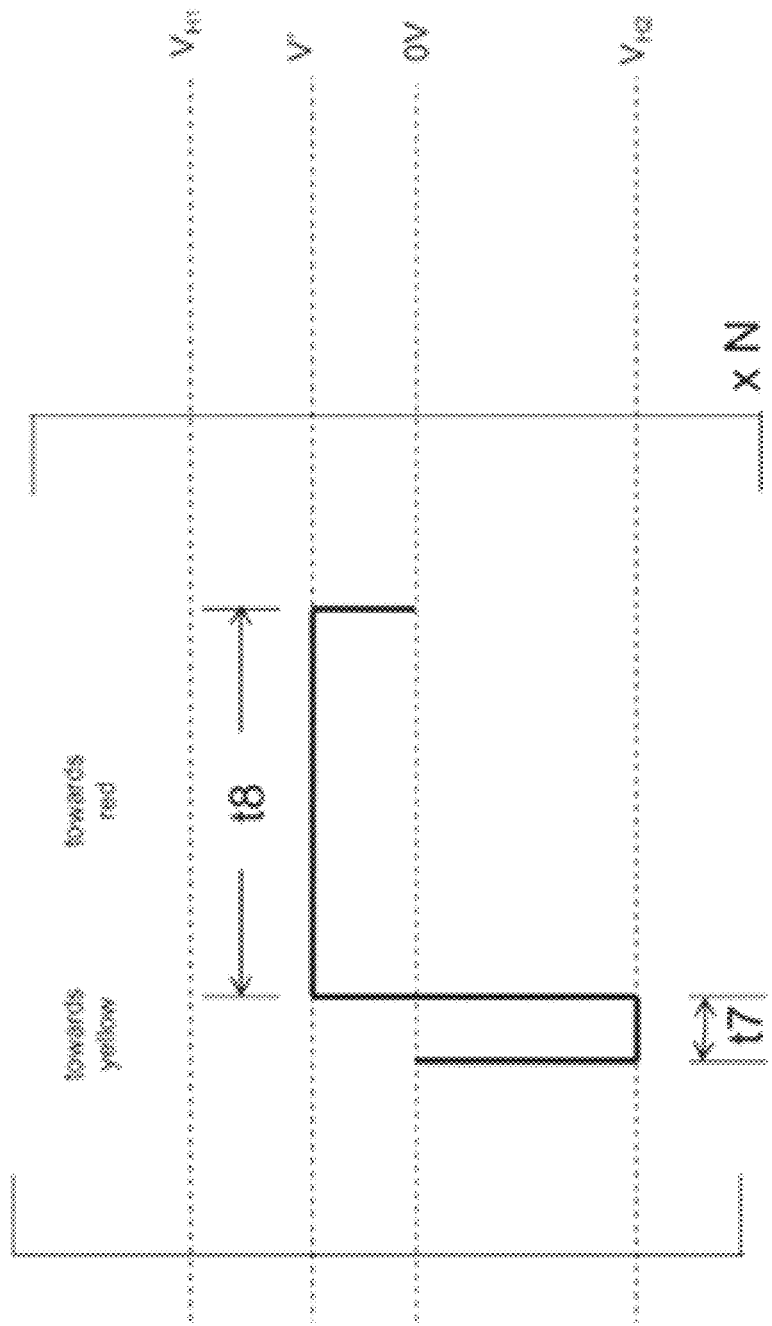
FIG. 5 illustrates one embodiment of driving an electro-optic display in accordance with the subject matter presented herein.

An exemplary waveform for accomplish this Yellow to Red transition is presented in FIG. 5.

Referring now to FIG. 5, in an initial step, the high negative driving voltage ($V_{H2}$, e.g., −15V) is applied for a period of t7 to push the yellow particles towards the viewing side, which is followed by a positive driving voltage (+V') for a period of t8, which pulls the yellow particles down and pushes the red particles towards the viewing side.

The amplitude of +V' is lower than that of $V_H$ (e.g., $V_{H1}$ or $V_{H2}$). In one embodiment, the amplitude of the +V' is less than 50% of the amplitude of $V_H$ (e.g., $V_{H1}$ or $V_{H2}$).

In one embodiment, t8 is greater than t7. In one embodiment, t7 may be in the range of 20-400 msec and t8 may be ≥200 msec.

The waveform of FIG. 5 may be repeated for at least 2 cycles (N≥2), preferably at least 4 cycles and more preferably at least 8 cycles. The red color becomes more intense after each driving cycle.

Figure 6:
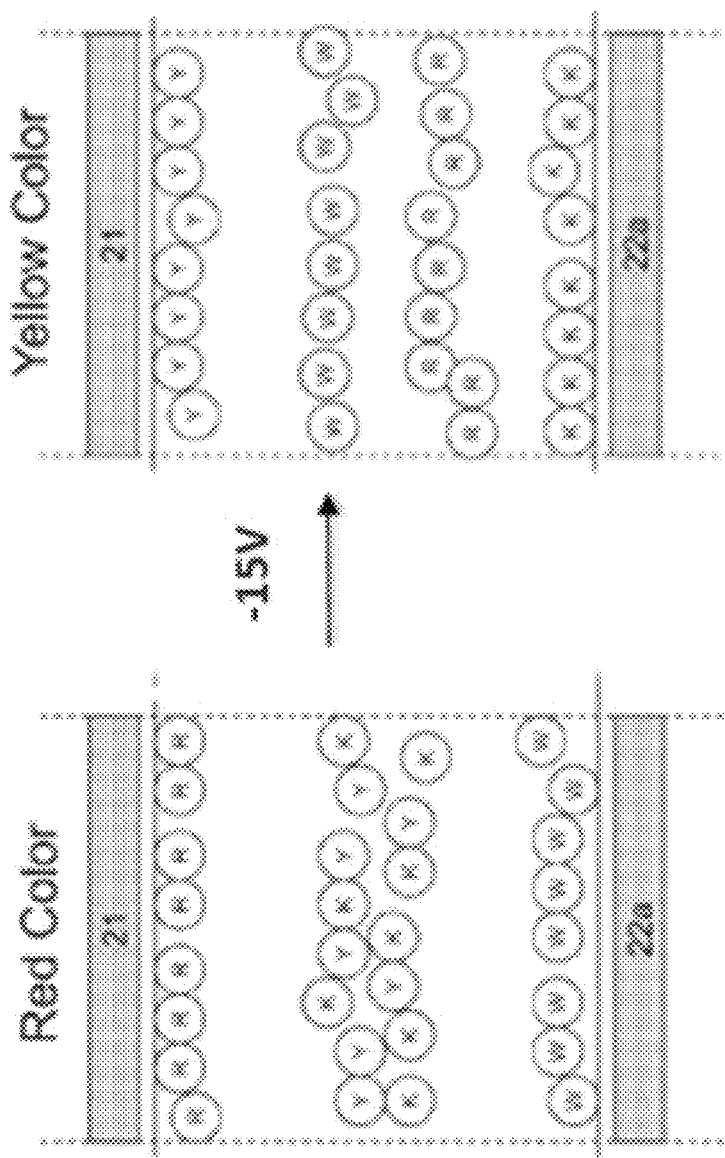
FIG. 6 illustrates an electro-optic display going from red to yellow in accordance with the subject matter presented herein.
Figure 7:
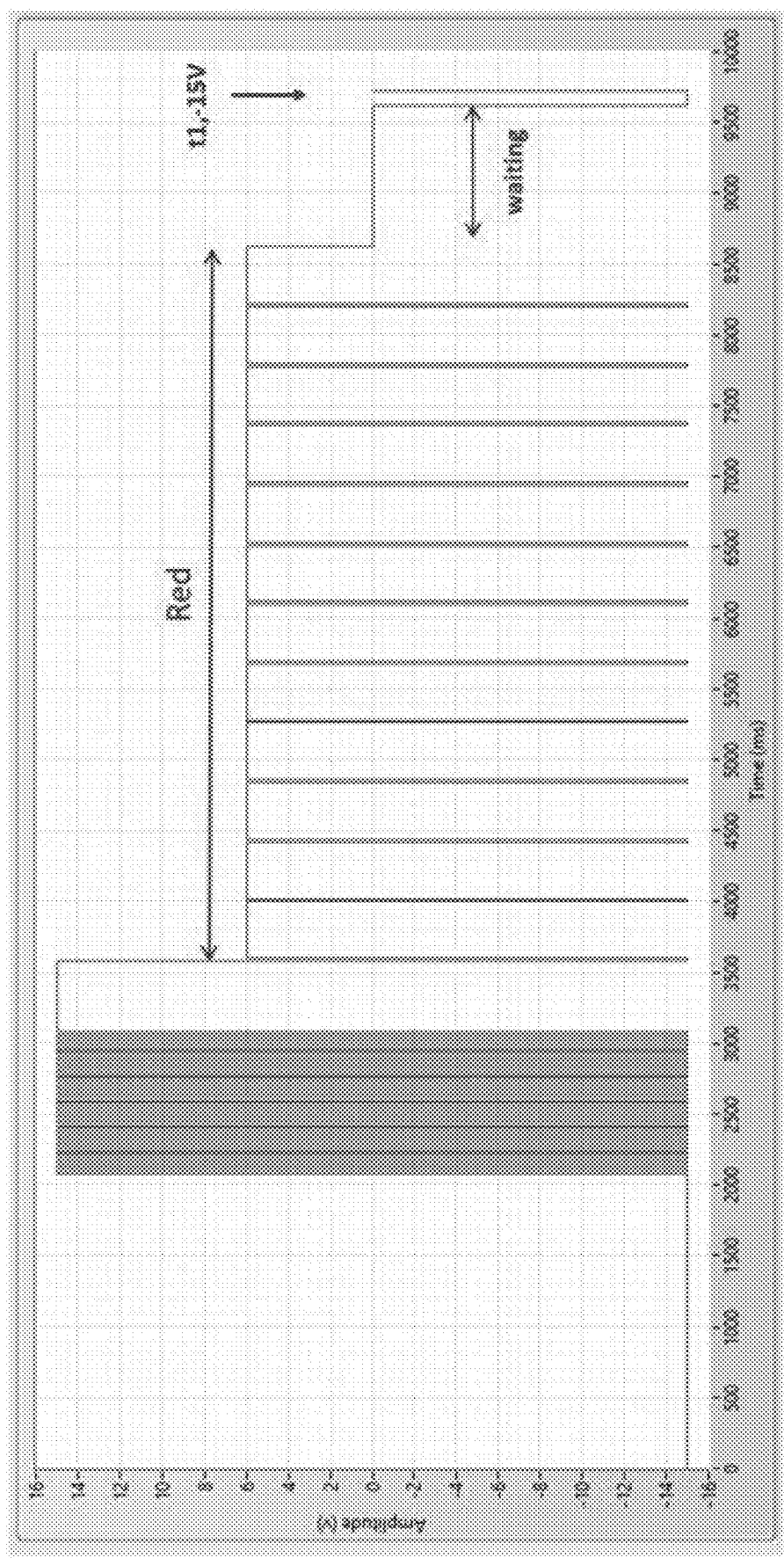
FIG. 7 illustrates yet another embodiment of a driving method for driving an electro-optic display in accordance with the subject matter presented herein.

Similarly, the display may be driven from a Red state to a Yellow state, as illustrated in FIG. 6. In practice, to drive a display pixel to a Yellow state, a short negative fifteen volt pulse may be applied after the Red waveform as presented in FIG. 7. The Yellow particles are preferably particles carrying high negative charges and are strongly negative and will be pushed to the viewing side by the negative fifteen volt pulse (e.g., t1 as illustrated in FIG. 7).

In practice however, the Yellow state described above may be the most thermal sensitive and RA decays the most. In some cases, the Yellow state may have a lower b* while the L* is good. Which means that there may not be enough Yellow particles on the view side. The Yellow particles are mixed with the white particles or even behind white particles.

Where b* and L* are Commission Internationale de L'Elcairage or CIE color coordinates, where L* indicates lightness and b* is the yellow/blue coordinate.

Figure 8:
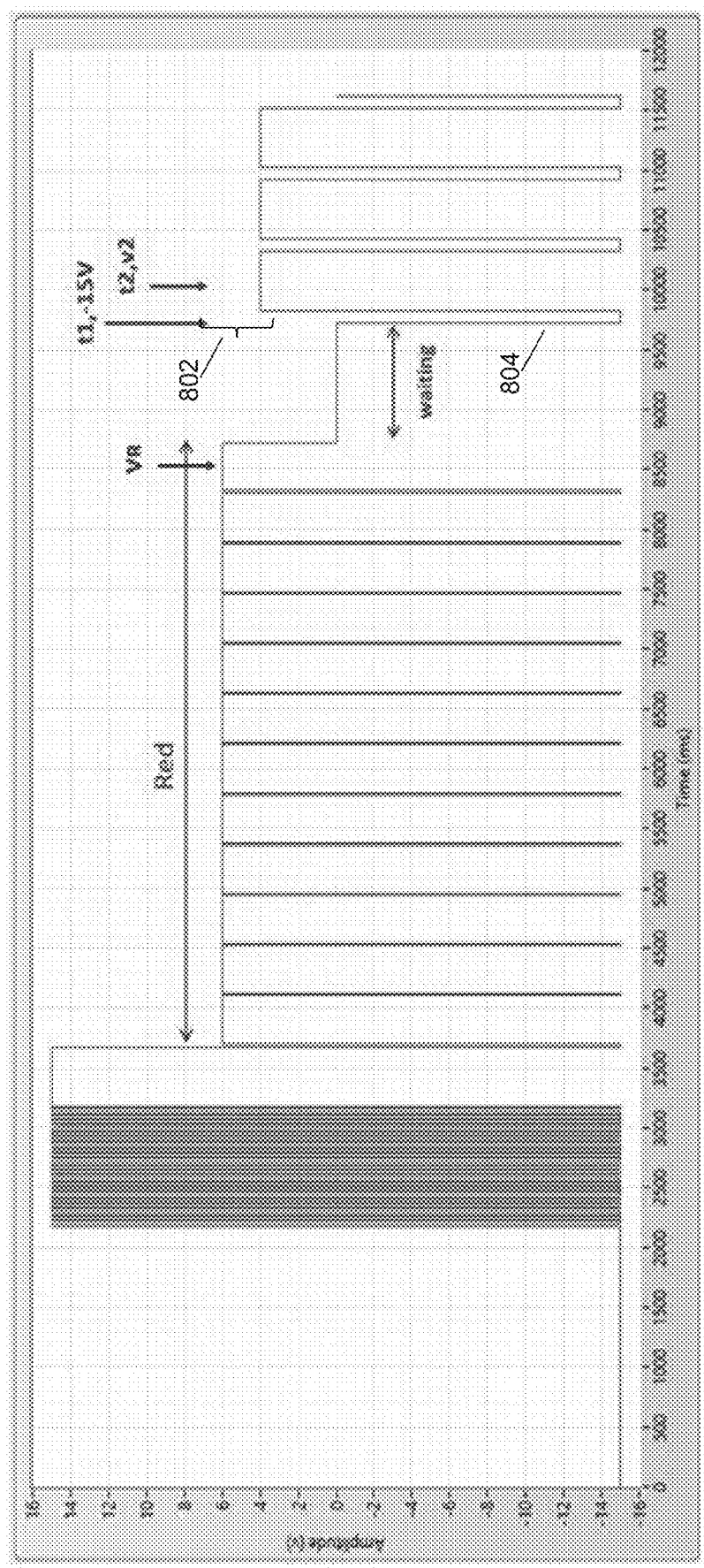
FIG. 8 illustrates another embodiment of a driving method for driving an electro-optic display in accordance with the subject matter presented herein.

In some embodiment, a waveform may be used to improve this issue. As FIG. 8 illustrates, to separate the white particles from the yellow particles, a weak positive voltage v2 802 may be applied after the −15V pulse (i.e., t1 804). Where the white particles are weak negatively charged and can be further pulled to the bottom by the weak positive voltage. Subsequently, another −15V pulse is applied to pull the yellow particles further up towards the viewing side, followed by another weak positive voltage v2. Furthermore, with additional added cycles, more white particles may be pulled to the bottom while strong negatively charged yellow particles may stay on the viewing side. The exact number of driving cycles and pulse width may be optimized based on the physical nature of the display medium.

In one embodiment, a driving method in accordance with the subject matter presented herein may be summarized as a driving method for driving a pixel of an electrophoretic display comprising a first surface on a viewing side, a second surface on a non-viewing side, and an electrophoretic fluid disposed between a first light-transmissive electrode a second electrode, the electrophoretic fluid comprising a first type of particles, a second type of particles, a third type of particles, and a fourth type of particles, all of which are dispersed in a solvent, wherein a. the four types of pigment particles have different optical characteristics;

b. the first type of particles and the third type of particles are positively charged, wherein the first type of particles have a greater magnitude of positive charge than the third particles; and c. the second type of particles and the fourth type of particles are negatively charged, wherein the second type of particles have a greater magnitude of negative charge than the fourth particles;

the method comprises the steps of:

(i) applying a first driving voltage to the pixel of the electrophoretic display for a first period of time at a first amplitude to drive the pixel to a color state of the fourth type of particle at the viewing side; and (ii) applying a second driving voltage to the pixel of the electrophoretic display for a second period of time, opposite to that of the first driving voltage and a second amplitude smaller than that of the first amplitude, to drive the second type particle towards the non-viewing side.

In another embodiment, a driving method in accordance with the subject matter presented herein may be summarized as a driving method for driving a pixel of an electrophoretic display comprising a first surface on a viewing side, a second surface on a non-viewing side, and an electrophoretic fluid disposed between a first light-transmissive electrode a second electrode, the electrophoretic fluid comprising a first type of particles, a second type of particles, a third type of particles, and a fourth type of particles, all of which are dispersed in a solvent, wherein a. the four types of pigment particles have different optical characteristics;

b. the first type of particles and the third type of particles are positively charged, wherein the first type of particles have a greater magnitude of positive charge than the third particles; and c. the second type of particles and the fourth type of particles are negatively charged, wherein the second type of particles have a greater magnitude of negative charge than the fourth particles;

the method comprises the steps of:

i. applying a first driving voltage to the pixel of the electrophoretic display for a first period of time at a first amplitude to drive the pixel to a color state of the third type of particle at the viewing side;

ii. applying a second driving voltage to the pixel of the electrophoretic display for a second period of time at a second amplitude to drive the pixel to a color state of the fourth type of particle at the viewing side; and iii. applying a third driving voltage to the pixel of the electrophoretic display for a third period of time, opposite to that of the second driving voltage and a third amplitude smaller than that of the second amplitude, to drive the second type particle towards the non-viewing side.

Figure 9:
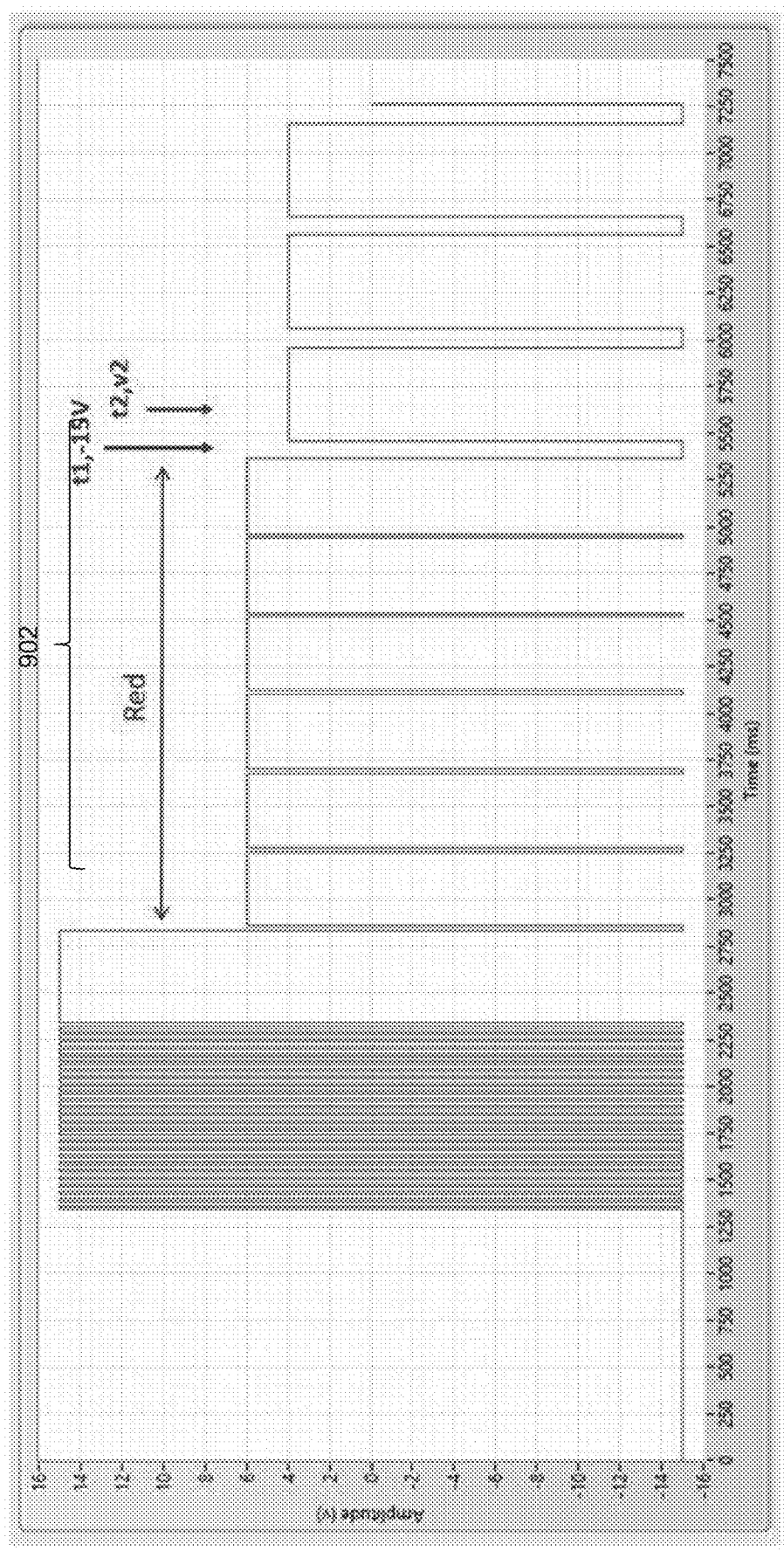
FIG. 9 illustrates yet another embodiment of a driving method for driving an electro-optic display in accordance with the subject matter presented herein.

In some embodiments, the voltage v2 may be different from the PP voltage VR for driving the pixel to the Red state. In some other embodiments, the Red waveform cycles 902 and waiting time between the Red waveform and the t1 waveform can be further optimized to shorten the overall waveform length, as illustrated in FIG. 9. For example, in some embodiments the waiting time may be considerably reduced. In another embodiment, the wait time may be entirely removed.

TABLE 1

| | | Initial EO | | | After Q-Sun Decay | | | After 70c Decay | | |
|---|---|---|---|---|---|---|---|---|---|---|
| RS ID # | WF | L* | a* | b* | ΔL* | Δa* | Δb* | ΔL* | Δa* | Δb* |
| RS180426-47 | Old Y WF | 57.5 | 10.2 | 54.9 | −5.4 | 1.4 | −11.5 | −3.9 | 0.8 | −8.5 |
| | New Y WF | 59.8 | 7.6 | 55.2 | −3.1 | 2 | −0.4 | −2.9 | 1.5 | −1.4 |

Illustrated in Table 1 above is experimental data showing the yellow state optical performance before and after reliability test using the old and new waveforms. One can see the yellow CIE indicator b* has improved by using the new yellow waveform presented herein.

Figure 10:
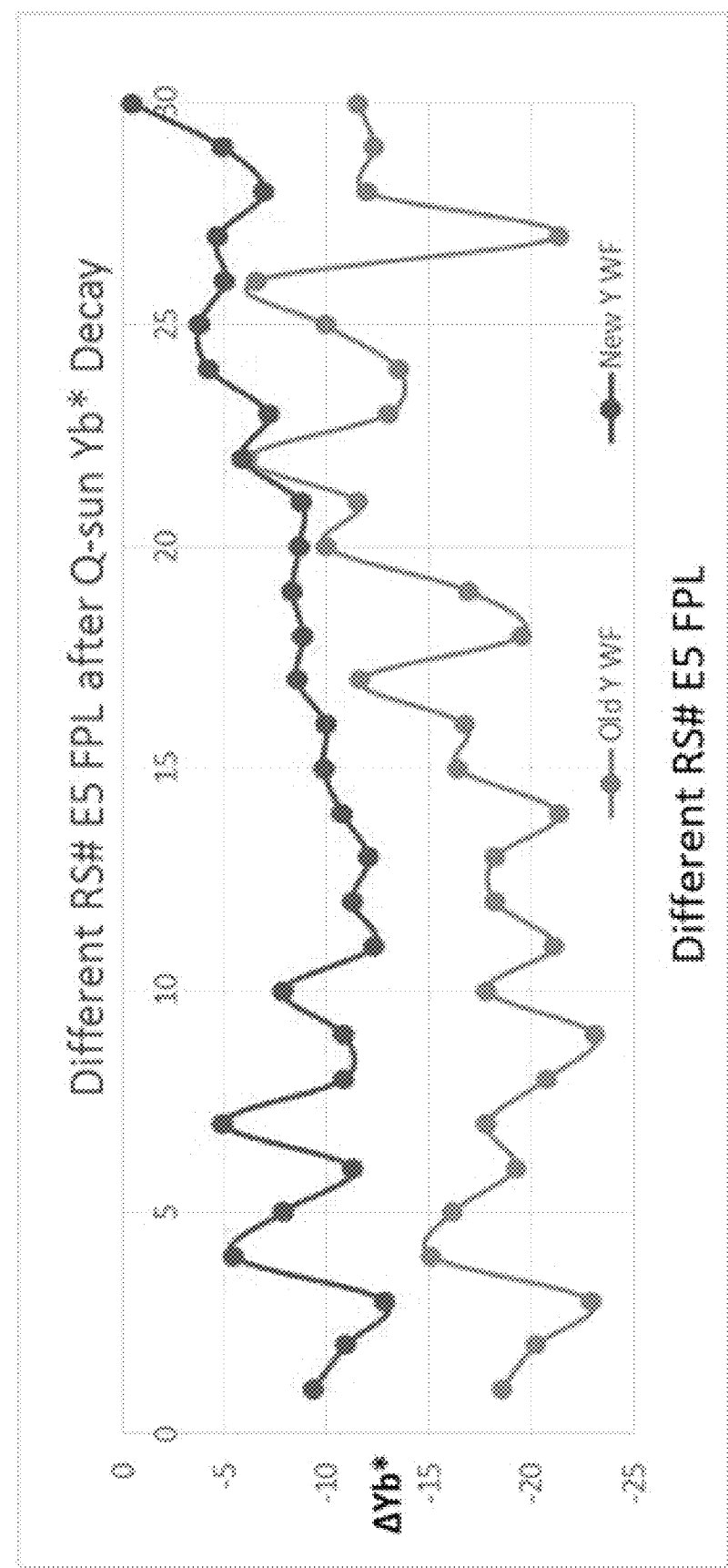
FIG. 10 illustrates experimental results of a Qsun test in accordance with the subject matter presented herein.
Figure 11:
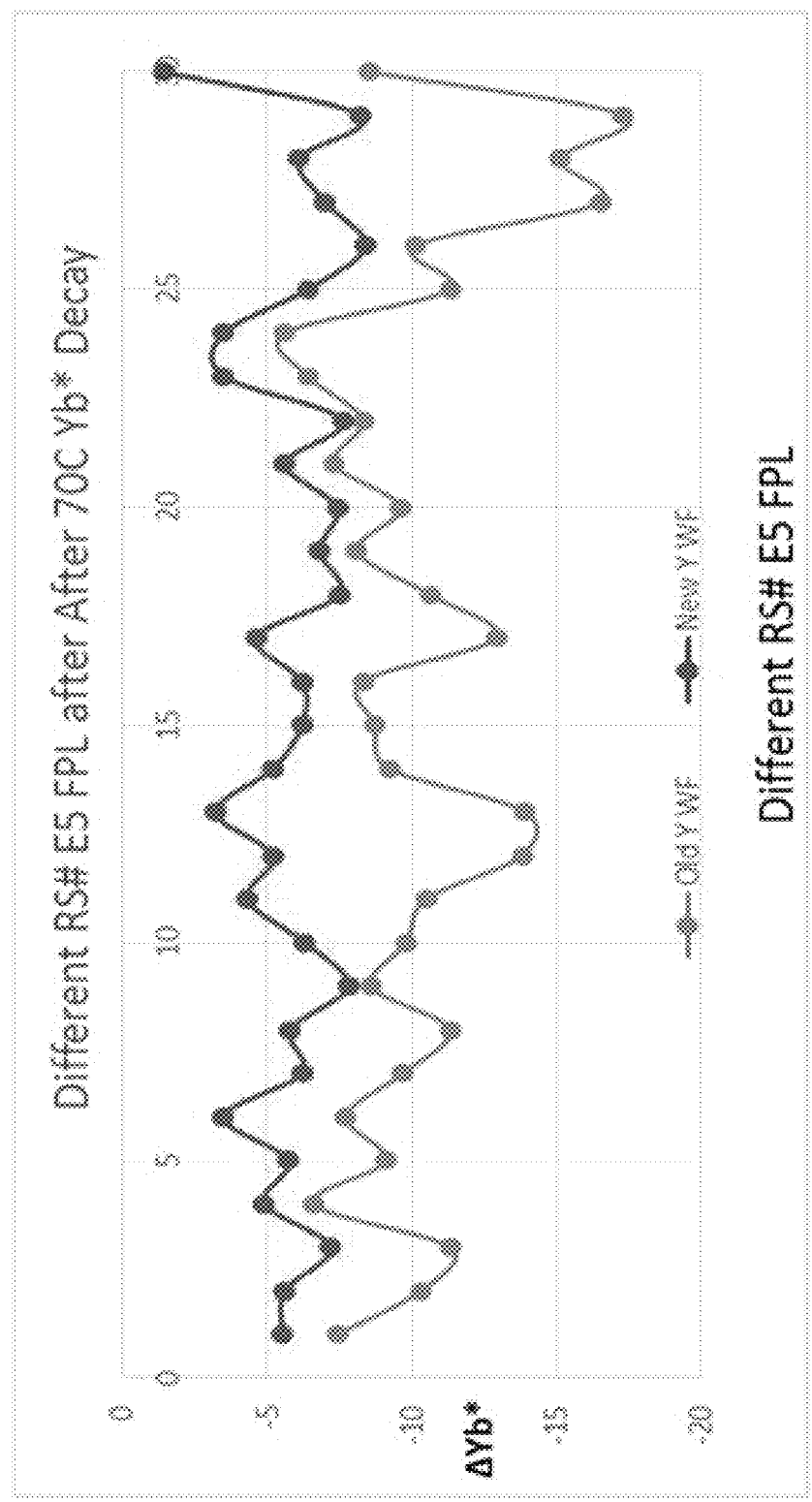
FIG. 11 illustrates experimental results of a RA test in accordance with the subject matter presented herein.

FIG. 10 and FIG. 11 illustrate the data of 30 samples with different particle dispersion formulations that went through the Qsun (FIG. 10) and 70C RA (FIG. 11) tests. Both tests shown improvements in b* using the new waveforms.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

What is claimed is:

1. A driving method for driving a pixel of an electrophoretic display comprising a first surface on a viewing side, a second surface on a non-viewing side, and an electrophoretic fluid disposed between a first light-transmissive electrode and a second electrode, the electrophoretic fluid comprising a first type of particles, a second type of particles, a third type of particles, and a fourth type of particles, all of which are dispersed in a solvent,
wherein
  a. the four types of pigment particles have different optical characteristics;
  b. the first type of particles and the third type of particles are positively charged, wherein the first type of particles have a greater magnitude of positive charge than the third particles; and
  c. the second type of particles and the fourth type of particles are negatively charged, wherein the second type of particles have a greater magnitude of negative charge than the fourth type of particles;
the driving method comprises the steps of:
  (i) applying a first driving voltage to the pixel of the electrophoretic display for a first period of time at a first amplitude to drive the third type particle towards the viewing side;
  (ii) applying a second driving voltage to the pixel of the electrophoretic display for a second period of time at a second amplitude to drive second type particle towards the viewing side; and
  (iii) applying a third driving voltage to the pixel of the electrophoretic display for a third period of time at a third amplitude to drive the fourth type particle towards the non-viewing side, and
  (iv) applying the second driving voltage to the pixel of the electrophoretic display for the second period of time at the second amplitude to drive the pixel to a color state of the second type of particle at the viewing side;
  (v) before step (i), applying a fifth driving voltage to the pixel of the electro-optic display for a fifth period of time at a fifth amplitude, wherein the amplitude of the fifth driving voltage is larger than the amplitude of the first driving voltage, the polarity of the fifth driving voltage is opposite to the polarity of the first driving voltage, the fifth period of time is different from the first period of time, and wherein the fifth period of time is different from the second period of time;
wherein the amplitude of the first driving voltage is different from the amplitude of the third driving voltage, the first period of time is different from the third period of time, and the polarity of the first diving voltage is the same as the polarity of the third driving voltage;
wherein the amplitude of the second driving voltage is larger than the amplitude of the first driving voltage, and the polarity of the second driving voltage is opposite to the polarity of the first driving voltage; and
wherein the amplitude of the second driving voltage is larger than the amplitude of the third driving voltage, the third period of time is longer than the second period of time, and the polarity of the second driving voltage is opposite to the polarity of the third driving voltage.

2. The driving method of claim 1 further comprising applying no driving voltage to the display pixel for a fourth period of time after the step (i) and before the step (ii).

3. The driving method of claim 1, wherein a combination of step (iii) followed by step (iv) is repeated to a total of at least 3 times after step (ii).

4. The driving method of claim 1, wherein the amplitude of the third driving voltage is less than 50% of the amplitude of the second driving voltage.

5. The driving method of claim 1, wherein a combination of step (v) followed by step (i) is repeated at least one time before applying the second driving voltage.

6. The driving method of claim 5, wherein a combination of step (iii) followed by step (iv) is repeated at least three times after step (ii).

7. The driving method of claim 1, wherein the color of the second type of particles is yellow, and the color of the fourth type of particles in white.

8. The driving method of claim 7, wherein the color of the first type of particles is black and the color of the third type of particles is red.

9. The driving method of claim 1, wherein the color of the second type of particles is red, and the color of the fourth type of particles in white.

10. The driving method of claim 9, wherein the color of the first type of particles is black and the color of the third type of particles is yellow.

11. The driving method of claim 1, wherein the electrophoretic fluid comprises yellow charged particles and red charge particles, wherein the yellow charged particles and the red charged particles carry the same charge polarity, and wherein the yellow charged particles carry higher charge than the red charged particles.

12. A driving method for driving a pixel of an electrophoretic display comprising a first surface on a viewing side, a second surface on a non-viewing side, and an electrophoretic fluid disposed between a first light-transmissive electrode and a second electrode, the electrophoretic fluid comprising a first type of particles, a second type of particles, a third type of particles, and a fourth type of particles, all of which are dispersed in a solvent, wherein
- a. the four types of pigment particles have different optical characteristics;
- b. the first type of particles and the third type of particles are positively charged, wherein the first type of particles have a greater magnitude of positive charge than the third particles; and
- c. the second type of particles and the fourth type of particles are negatively charged, wherein the second type of particles have a greater magnitude of negative charge than the fourth type of particles;

the driving method comprises the steps of:
- (i) applying a first driving voltage to the pixel of the electrophoretic display for a first period of time at a first amplitude to drive the third type particle towards the viewing side;
- (ii) applying a second driving voltage to the pixel of the electrophoretic display for a second period of time at a second amplitude to drive second type particle towards the viewing side; and
- (iii) applying a third driving voltage to the pixel of the electrophoretic display for a third period of time at a third amplitude to drive the fourth type particle towards the non-viewing side, and
- (iv) applying the second driving voltage to the pixel of the electrophoretic display for the second period of time at the second amplitude to drive the pixel to a color state of the second type of particle at the viewing side;

wherein a combination of step (iii) followed by step (iv) is repeated to a total of at least 3 times after step (ii);

wherein the amplitude of the first driving voltage is different from the amplitude of the third driving voltage, the first period of time is different from the third period of time, and the polarity of the first driving voltage is the same as the polarity of the third driving voltage;

wherein the amplitude of the second driving voltage is larger than the amplitude of the first driving voltage, and the polarity of the second driving voltage is opposite to the polarity of the first driving voltage; and wherein the amplitude of the second driving voltage is larger than the amplitude of the third driving voltage, the third period of time is longer than the second period of time, and the polarity of the second driving voltage is opposite to the polarity of the third driving voltage.

13. The driving method of claim 12 further comprising applying no driving voltage to the display pixel for a fourth period of time after the step (i) and before the step (ii).

14. The driving method of claim 12, wherein the amplitude of the third driving voltage is less than 50% of the amplitude of the second driving voltage.

15. The driving method of claim 12, wherein the method further comprises a step (v) of: before step (i), applying a fifth driving voltage to the pixel of the electro-optic display for a fifth period of time at a fifth amplitude, wherein the amplitude of the fifth driving voltage is larger than the amplitude of the first driving voltage, the polarity of the fifth driving voltage is opposite to the polarity of the first driving voltage, the fifth period of time is different from the first period of time, and wherein the fifth period of time is different from the second period of time.

16. The driving method of claim 15, wherein a combination of step (v) followed by step (i) is repeated at least one time before applying the second driving voltage.

17. The driving method of claim 12, wherein the color of the second type of particles is yellow, and the color of the fourth type of particles in white.

18. The driving method of claim 17, wherein the color of the first type of particles is black and the color of the third type of particles is red.

19. The driving method of claim 12, wherein the color of the second type of particles is red, and the color of the fourth type of particles in white.

* * * * *